US008117413B2

(12) United States Patent
Pace (10) Patent No.: US 8,117,413 B2
(45) Date of Patent: Feb. 14, 2012

(54) LOGICAL DATA SET MIGRATION

(75) Inventor: Richard G. Pace, Simi Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 722 days.

(21) Appl. No.: 12/238,273

(22) Filed: Sep. 25, 2008

(65) Prior Publication Data

US 2010/0077169 A1 Mar. 25, 2010

(51) Int. Cl.
*G06F 12/02* (2006.01)
*G06F 12/16* (2006.01)

(52) U.S. Cl. ........ 711/165; 707/641; 711/147; 711/161; 711/162

(58) Field of Classification Search ................... 711/165; 707/641
See application file for complete search history.

(56) References Cited

U.S. PATENT DOCUMENTS

| 6,240,486 | B1 | 5/2001 | Ofek et al. | |
| 6,356,977 | B2* | 3/2002 | Ofek et al. | 711/112 |
| 7,146,475 | B2 | 12/2006 | Perego | |
| 7,346,664 | B2 | 3/2008 | Wong et al. | |
| 7,685,129 | B1* | 3/2010 | LeCrone et al. | 707/999.01 |
| 7,707,186 | B2* | 4/2010 | LeCrone et al. | 707/656 |
| 2003/0037019 | A1* | 2/2003 | Nakamura | 707/1 |
| 2005/0108485 | A1 | 5/2005 | Perego | |
| 2007/0113157 | A1 | 5/2007 | Perego | |
| 2007/0198561 | A1* | 8/2007 | Lee et al. | 707/101 |
| 2009/0006432 | A1* | 1/2009 | Bossong-Iselborn | 707/100 |
| 2009/0307245 | A1* | 12/2009 | Mullen et al. | 707/101 |
| 2010/0088353 | A1* | 4/2010 | Lee et al. | 707/809 |

FOREIGN PATENT DOCUMENTS

| CA | 2518989 | 6/2005 |
| EP | 1685492 | 8/2006 |
| WO | WO-2005/052796 | 6/2005 |

* cited by examiner

*Primary Examiner* — John Lane
(74) *Attorney, Agent, or Firm* — Schmeiser, Olsen & Watts; John R. Pivnichny (57) ABSTRACT

A method for performing data set migration includes receiving a request to migrate data sets, finding the systems with the data sets open, establishing at least one I/O intercept, copying the data set, mirroring changes to the data set, updating control information in the systems with the data sets open, and terminating the at least one I/O intercept.

24 Claims, 10 Drawing Sheets

LOGICAL DATA SET MIGRATION

TECHNICAL FIELD

This disclosure generally relates to data storage. More specifically, this disclosure relates to migrating data of a data set from one location to another location.

BACKGROUND

In the era of electronic data access, businesses and organizations rely heavily on instant access to centralized data storage systems. These systems store vast amounts of data that are easily searchable and can be readily processed to produce documents for internal or external use. Due to the electronic nature of these data storage systems, around-the-clock access is not only assumed possible, but is paramount to the success of businesses and organizations relying on the data. A loss in ability to access data stored in the data storage system often forces the business to temporarily pause its operation causing a loss in revenue and customers.

Data storage systems are typically one or more data storage devices which store data coupled to a processing unit for accessing and processing the stored data. The data storage devices can include tape drives, hard drives, solid-state devices, or any other memory. Data stored on the data storage device are organized into data sets according to the system designer's specifications. Clients access the data storage system through terminals coupled to the data storage system.

Even during normal operation of a data storage system there may be a need to move ("migrate") data sets from one location to another. The data sets may be moved to a different position on the same data storage device or moved to a new data storage device. For example, the data sets may grow in size and reach a capacity limit of a current data storage device. In such a case, the business will install a new larger capacity data storage device. The data sets will then need to be moved from the old device to the new device. Performing the move is preferably done without terminating client access to the data. Migration processes perform the move process.

The conventional migration processes typically execute in two steps: a mirror phase and a re-direction phase. During the mirror phase, data sets are copied from the old data storage device to a new data storage device and all subsequent updates to the data sets are mirrored to both data storage devices. At a time when the old and new storage devices are synchronized, the migration process enters the re-direction phase. During re-direction the clients are directed to access the new data storage device rather than the old data storage device. Re-direction ends and the migration process is complete after all open data sets are closed.

A challenge for migration processes is that the data is typically being accessed and modified by a client during the migration. As a result, the migration process must keep track of changes in the old data set and mirror those changes to the new data set. Due to the size of the data sets, migration can often take several days and the task of mirroring the old data set further delays the migration process from completing until access to the data set has terminated. A data set open 24 hours a day and 7 days a week leads to a never ending migration process.

One current solution to the problem involves shutting down all clients of the data storage system, completing the migration process, and then reconnecting with clients. Another known solution to the problem is an "OPEN" interface such that the client closes the old data set and reopens the new data set.

Disadvantages to these solutions include coordinating a shut down of all clients using the data sets in the migration process, which is complicated and interrupts ongoing operation. The migration process cannot complete until all open instances are closed, and while the data sets are closed the clients cannot operate.

Therefore, there is a need for migrating data sets without needing to close the data sets before completing the migration process.

BRIEF SUMMARY

A method for completing a migration of an open data from a first storage location to a second location includes identifying any applications accessing the open data set being migrated. The method also includes updating control information of the identified application(s) accessing the open data set to reflect the second storage location, without terminating the identified application(s) or closing the data set, so the identified application(s) will access the open data set at the second location using the updated control information. The method further includes establishing I/O intercepts that redirect I/O requests from the first storage location to the second storage location.

A computer program product for data set migration includes a computer usable medium having embodied on it computer usable code. The computer usable code is configured to identify applications accessing a data set at a first location. The computer usable code is also configured to update control information of the identified application(s) accessing the data set to reflect a second location, without terminating the identified application(s) or closing the data set, so the identified application(s) will access the open data set at the second location using the updated control information. The computer usable code is further configured to establish I/O intercepts that redirect I/O requests from the first storage location to the second storage location.

An apparatus for migrating data sets includes means for identifying applications accessing a data set at a first location. The apparatus also includes means for updating control information of the identified applications accessing the data set to reflect a second location, without terminating the identified application(s) or closing the data set, so the identified application(s) will access the open data set at the second location using the updated control information. The apparatus further includes means for migrating the data set from the first location to the second location.

This has outlined, rather broadly, the features and technical advantages of the present invention in order that the detailed description that follows may be better understood. Additional features and advantages of the invention will be described below. It should be appreciated by those skilled in the art that this disclosure may be readily utilized as a basis for modifying or designing other structures for carrying out the same purposes of the present invention. It should also be realized by those skilled in the art that such equivalent constructions do not depart from the teachings of the invention as set forth in the appended claims. The novel features, which are believed to be characteristic of the invention, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosure in the present application, reference is now made to the following descriptions taken in conjunction with the accompanying drawings.

DETAILED DESCRIPTION

Figure 9:
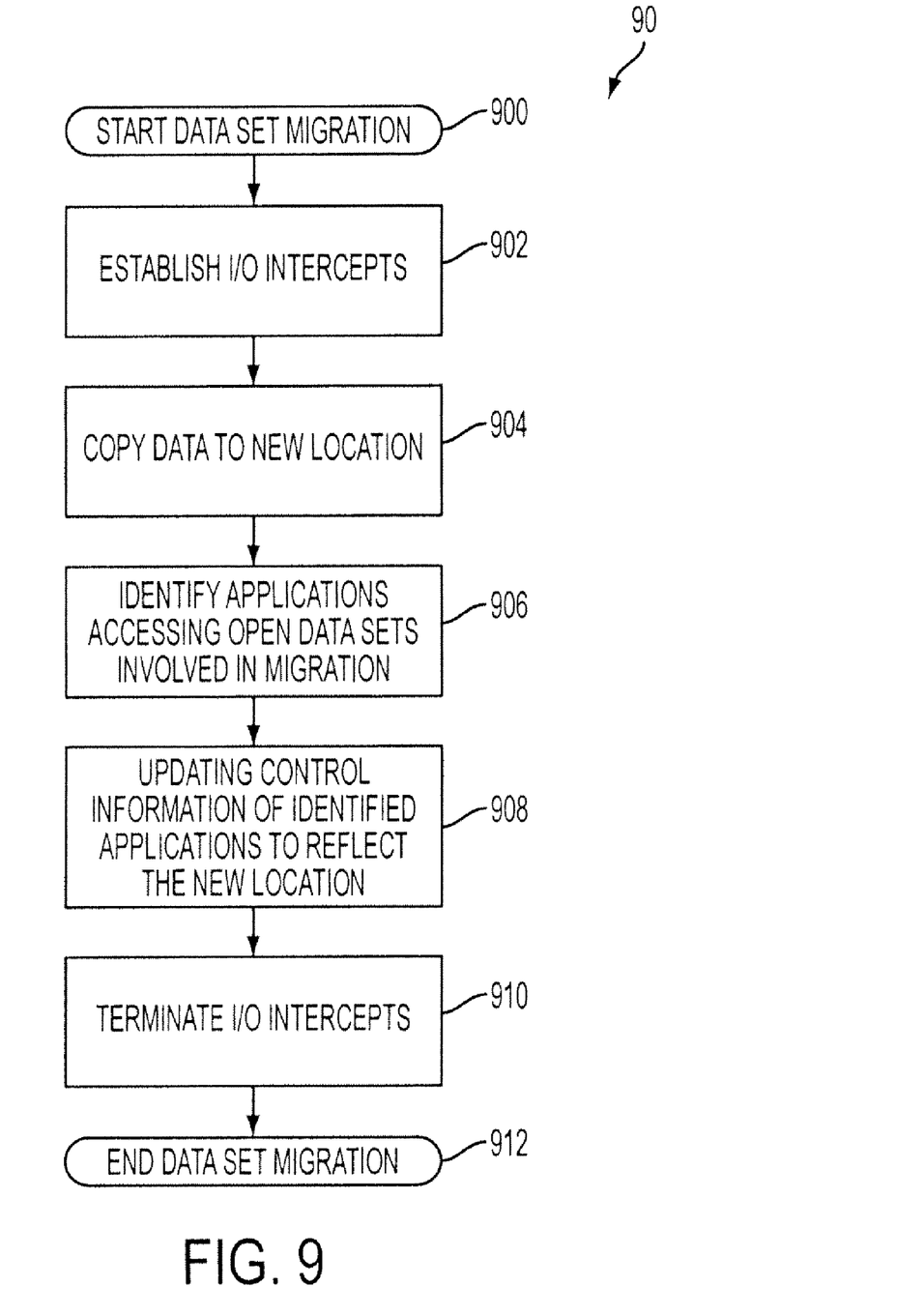
FIG. 9 is a flow diagram illustrating the exemplary migration process according to one embodiment of the disclosure.

The exemplary migration process disclosed offers the capability of migrating data sets from an old location to a new location without shutting down applications accessing the data sets involved in the migration process or waiting for the applications to shut down. FIG. 9 is a flow diagram illustrating the exemplary migration process according to one embodiment of the disclosure. The migration process begins at box 900 when a request to migrate data sets from old locations to new locations is received. Continuing to box 902, I/O intercepts are established for all systems involved in the migration process. At box 904, the data sets are copied from old locations to new locations. Next, at box 906, the migration process identifies applications accessing open data sets involved in the migration process. After identifying the applications involved in the migration process, the logic proceeds to box 908, and updates control information of the identified applications to reflect the new storage volume information. Next, at box 910, the migration process terminates the I/O intercepts established at box 902, and the data set migration process completes at box 912.

Figure 1:
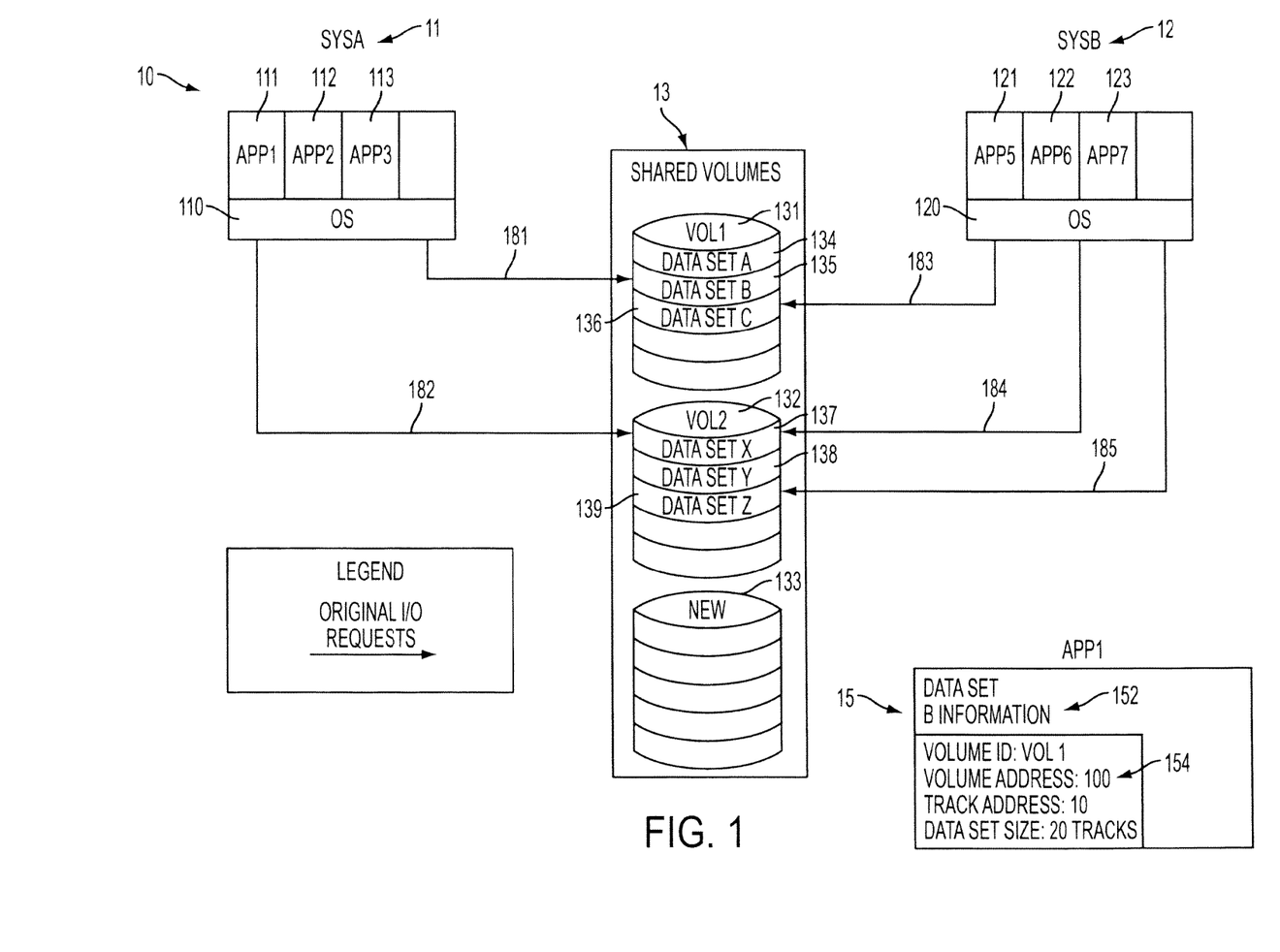
FIG. 1 is a block diagram illustrating a data storage system according to one embodiment of the disclosure.

Turning now to FIG. 1, a data storage system will be shown in which the exemplary migration process disclosed may be applied. FIG. 1 is a block diagram illustrating a data storage system according to one embodiment of the disclosure. The data storage system 10 includes system A (11) and system B (12). System A 11 includes an operating system 110 which may be the IBM mainframe operating system Z/OS®, in one embodiment. The operating system 110 interfaces with executing applications, for example, application 111, application 112, and application 113. Similarly, system B 12 includes an operating system 120 which may be the IBM mainframe operating system Z/OS®, but need not be the same as the operating system 110. Application 121, application 122, and application 123 are shown executing and interfacing with the operating system 120. Although only three applications are shown, of course more or fewer applications may be present.

Shared storage unit 13 contains a number of shared volumes including volume 1 (131), volume 2 (132), and volume NEW (133). The volumes could be physical storage volumes or virtual storage locations. Volume 1 131 contains a number of data sets including data set A 134, data set B 135, and data set C 136. Volume 2 132 contains a number of data sets including data set X 137, data set Y 138, and data set Z 139. Although only three data sets are shown for the sake of simplifying the explanation, of course many more or even fewer data sets may be present.

Each application executing on the operating system 110 or the operating system 120 makes a request to the operating system to read or write a data set on the shared storage unit 13. Applications reading or writing to a data set are said to have the data set allocated and open. After the application opens a data set, the application's control block is modified to include information about the data set. Shown in inset 15 is a detailed view of the application 111 and its control block information. Each application contains a record 152 of open data sets and a record 154 of the location of the data sets itself, including volume ID, location of the volume, location on the volume where the data set resides (track address), and the size of the data sets.

For illustrative purposes a set of input and output (I/O) requests are set up to demonstrate the exemplary migration process. In response to the operating system 110 receiving I/O requests from an application(s), on behalf of that application(s) the operating system 110 performs an I/O request 181 to data set B 135 and an I/O request 182 to data set X 137. Similarly, in response to the operating system 120 receiving I/O requests from an application(s), on behalf of that application(s), the operating system 120 performs an I/O request 183 to data set C 136, I/O request 184 to data set X 137, and I/O request 185 to data set Z 139 on behalf of a requesting application(s) in system B 12.

Figure 2:
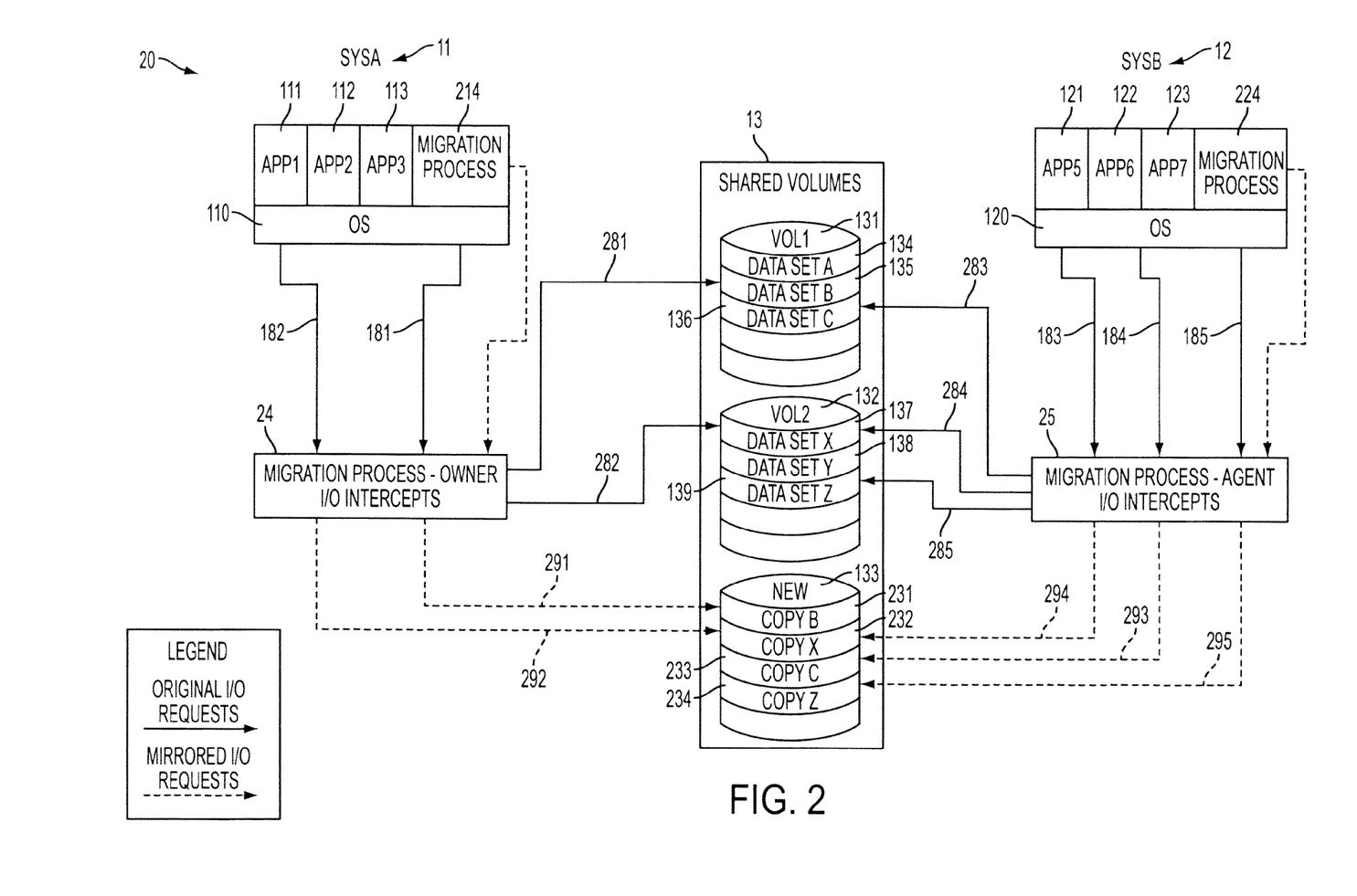
FIG. 2 is a block diagram illustrating the migration process after entering the mirror phase according to one embodiment of the disclosure.

Turning now to FIG. 2, explanation is provided of a migration process, once initiated. FIG. 2 is a block diagram illustrating the migration process after entering the mirror phase according to one embodiment of the disclosure. In this example, the system 20 receives a migration request to copy data set B 135 and data set C 136 from volume 1 131 to volume NEW 133. Additionally, the migration request includes copying data set X 137 and data set Z 139 from volume 2 132 to volume NEW 133. Although all data sets reside on a single volume, and are being migrated to a single volume, this is not the only possibility. The migration process will vary according to the existing data set structure and the desired new data set structure. The example given here only outlines one embodiment. During the mirror phase, an owner migration process 214 is started on system A 11 and an agent migration process 224 is started on system B 12. The owner migration process 214 and agent migration process 224 are responsible for copying the data sets being migrated from the old volumes to the new volume. In this example, data set B 135 and data set C 136 are copied from volume 1 131 to copy B 231 and copy C 233 on volume NEW 133, respectively. Additionally, data set X 137 and data set Z 139 are copied from volume 2 132 to copy X 232 and copy Z 234 on volume NEW 133, respectively.

According to an aspect of the present disclosure, the migration processes 214, 224 monitor all I/O requests to data sets being migrated through an installed owner I/O intercept 24 and an installed agent I/O intercept 25. In one embodiment, the I/O intercepts 24, 25 are installed when a migration process begins so that as soon as data sets are selected, intercepts are ready to be activated. The I/O intercepts 24, 25 intercept I/O requests from the operating system created in response to requests for an application(s). During the mirror stage, the applications continue to read and write to the data sets of the original volumes, as shown by the solid lines 181-185, 281, 285. Read requests are directed to the original volumes and are not mirrored. However, write requests are mirrored by the I/O intercepts 24, 25 such that the same write occurs to both the data set on the original volume and the copy on the new volume. In this manner, the original data set and the copy are kept synchronized.

In the example depicted in FIG. 2, I/O request 181 and I/O request 182 are intercepted by owner I/O intercept 24. Owner I/O intercept 24 mirrors I/O request 181 as I/O request 281 to data set B 135 and I/O request 291 to copy B 231. Owner migration process 24 also mirrors I/O request 182 as I/O request 282 to data set X 137 and I/O request 292 to copy X 232. Agent I/O intercept 25 mirrors I/O request 183 as I/O request 283 to data set C 136 and I/O request 293 to copy C 233. Agent I/O intercept 25 also mirrors I/O request 184 as I/O request 284 to data set X 137 and I/O request 294 to copy X 232. Agent I/O intercept 25 also mirrors I/O request 185 as I/O request 285 to data set Z 139 and I/O request 295 to copy Z 234.

Figure 3:
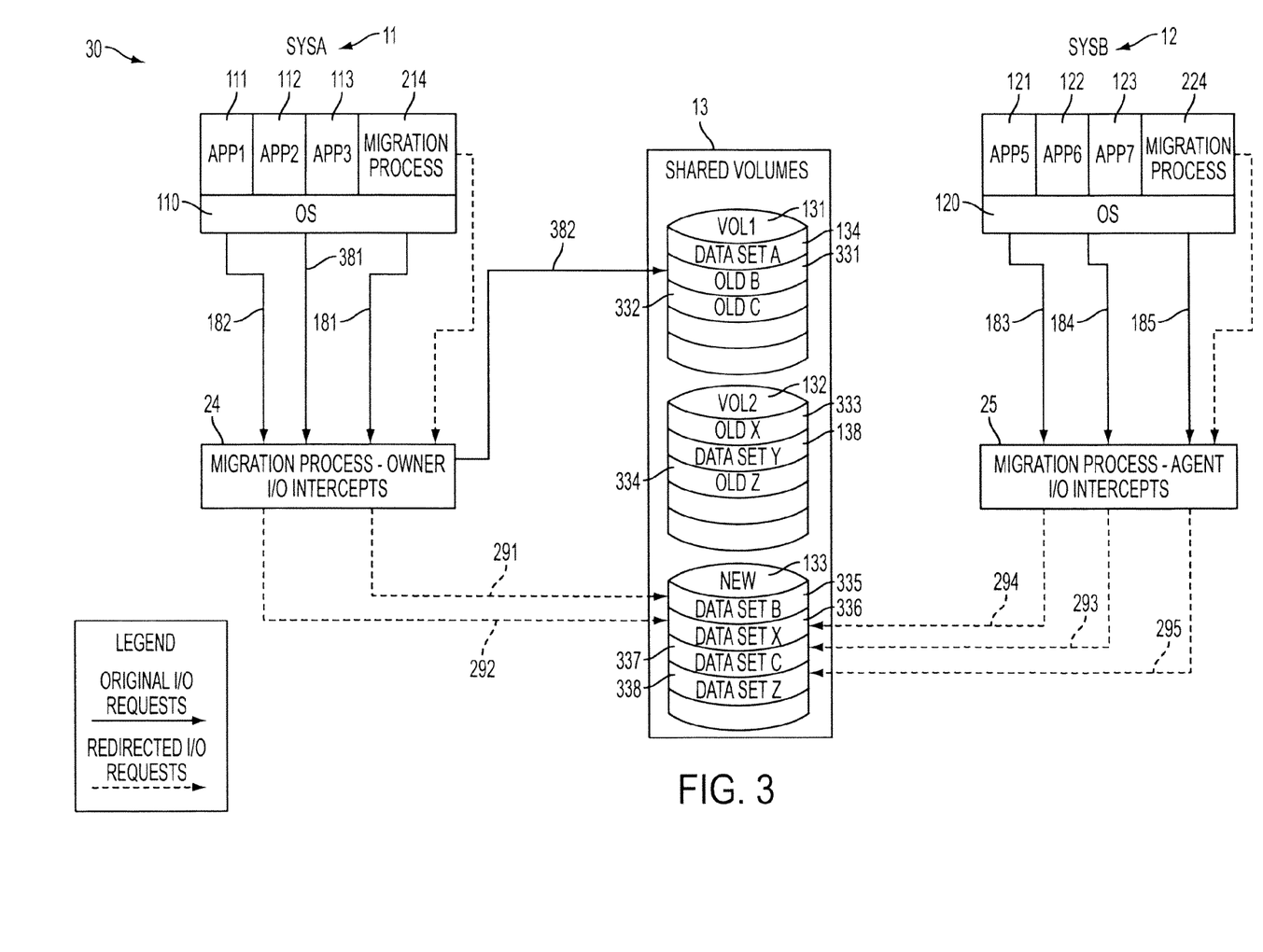
FIG. 3 is a block diagram illustrating the redirection phase of the migration process according to one embodiment of the disclosure.

Turning now to FIG. 3, a redirection phase is described. The redirection phase begins after the mirror phase has completed copying the data sets. FIG. 3 is a block diagram illustrating the redirection phase of the migration process according to one embodiment of the disclosure. In the redirection phase, the data sets on the new volume are renamed to the original data set name and the data sets on the original volume are renamed to an arbitrary name. In one embodiment, the original data sets are renamed to the copy data set names. The renaming is transparent to applications having data sets open.

In system 30, data set B 335, data set X 336, data set C 337, and data set Z 338 are located on volume 133. The original data sets are renamed as old B 331 and old C 332 located on volume 131 and old X 333 and old Z 334 located on volume 132. The control blocks in the applications accessing migrated data sets still contain the old volume information even though the data sets on the original volumes have been renamed. Thus, the applications having migrated data sets open still view the data sets as residing on the original volume. In order to address this issue, owner I/O intercept 24 and agent I/O intercept 25 intercept both read and write requests and translate requests to the renamed data set on the new volume. In the example of FIG. 3, the owner I/O intercept 24 redirects I/O request 181 as I/O request 291 to data set B 335. Owner I/O intercept 24 also redirects I/O request 182 as I/O request 292 to data set X 336.

The I/O intercepts 24, 25 continue to intercept I/O requests for as long as an application, which had a data set open before the migration process began, continues to execute and access the data set.

Applications making I/O requests to data sets which are not part of the migration process are not impacted. For example, I/O request 381 is intercepted by the owner I/O intercept 24, but continues to data set A 134 because data set A is not migrating. Applications beginning execution after the redirection phase has begun do not require I/O monitoring by the I/O intercepts 24, 25.

A migration is considered complete when the I/O intercepts 24, 25 are no longer needed to monitor any I/O requests for the migrated data sets. According to an aspect of the present disclosure, the migration process is completed, without requiring applications accessing the migrated data sets to terminate or restart. This is accomplished with the migration processes 214, 224 updating the application control blocks to reflect the new volume where the data sets are located. The updating occurs after the redirection phase has started.

Figure 4:
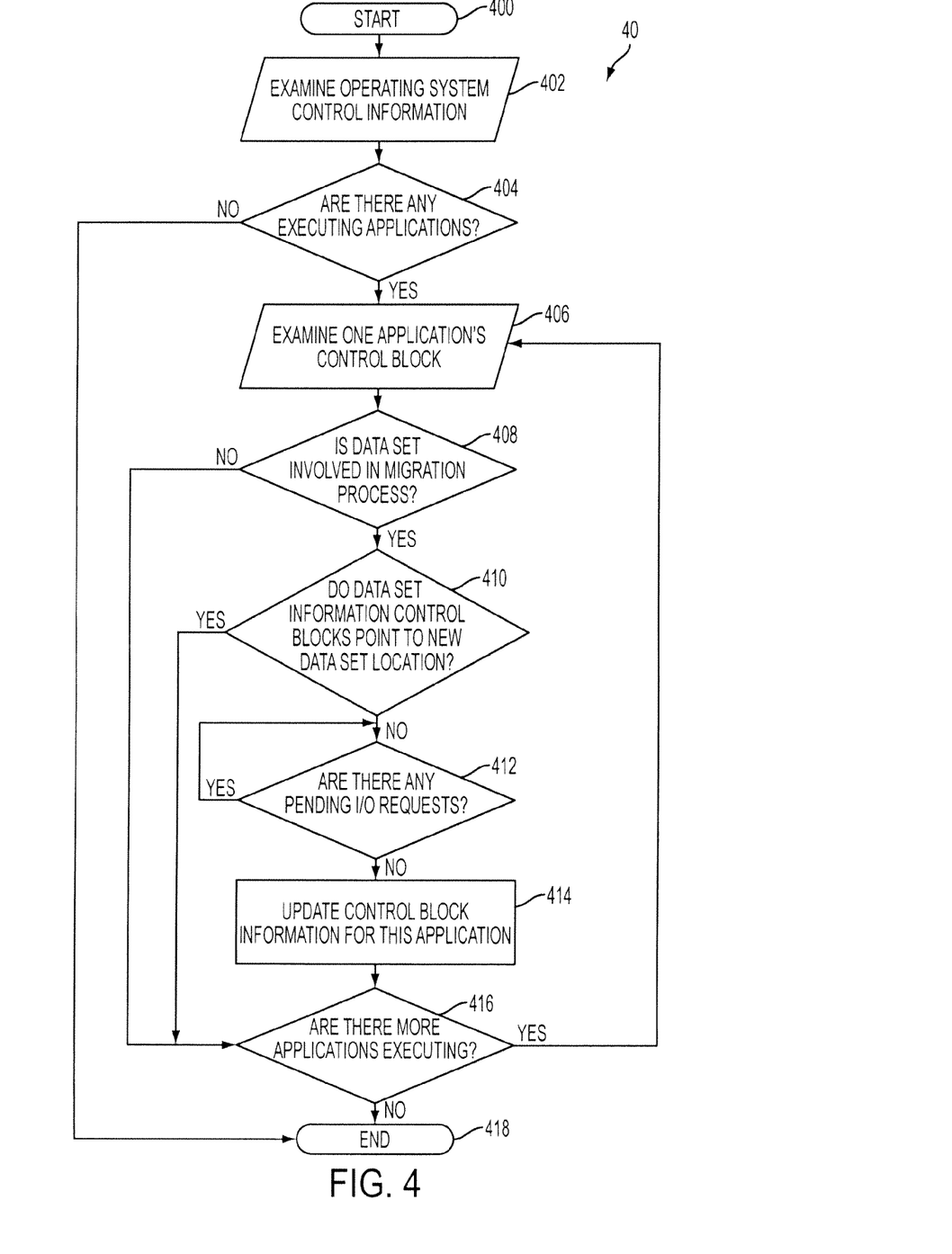
FIG. 4 is a flow diagram illustrating exemplary logic for searching operating system control information and updating application control block information according to one embodiment of the disclosure.

In order to update the application control blocks the migration process searches operating system control information to determine executing applications. Turning now to FIG. 4, exemplary search logic will be discussed in more detail. FIG. 4 is a flow diagram illustrating logic for searching operating system control information and updating application control block information according to one embodiment of the disclosure. The logic starts at box 400 and proceeds to examine the operating system control information at box 402. Using the control information collected at box 402, the logic searches for any executing applications. If there are no executing applications, the logic terminates at box 418. If there are executing applications found at box 404 the logic proceeds to box 406. At box 406, the application's control block information is searched to find allocated data sets.

Next, at box 408, the data set name contained in the control block is compared to the data sets involved in the migration process to determine if the application is accessing a data set involved in the migration process. If the data set identified by the examined information is not involved in the migration process, the logic proceeds to box 416. If the data set identified is involved in the migration process, the logic proceeds to box 410.

At box 410, if the control block information already points to the new location, then no updating is needed and the logic continues to box 416. In this case, the control block information was updated during a previous pass through this logic, or the application allocated the data set after the redirection phase. Otherwise, the logic identifies this application as having control blocks that need to be updating and proceeds to box 412. The updating can only occur at a time when there are no pending I/O requests from that application. At box 412, the logic checks to see if there are any pending I/O requests from the application. If there are pending I/O requests, the logic waits at box 412 until such a time that there are no pending I/O requests and proceeds to box 414. At box 414, the data set location information in the control blocks of the executing application with an open data set involved in migration are updated. Examples of control block information will be described in further detail later in this disclosure.

After updating information in the application, the logic proceeds to box 416. At box 416, the logic checks if there are any more applications executing in the operating system. If there are additional applications executing, the logic returns to box 406 and examines the next application's control blocks. If there are no more executing applications to examine, the logic terminates at box 418.

In another embodiment, when a pending I/O request exists, updating occurs prior to the I/O activity. It should be noted that this logic outlines only exemplary logic that could be used to carry out the tasks at hand. The logic may be modified from this embodiment to operate on multiple processors, for example, by examining multiple applications simultaneously, or returning to applications with pending I/O requests at a later time rather than waiting.

Figure 5:
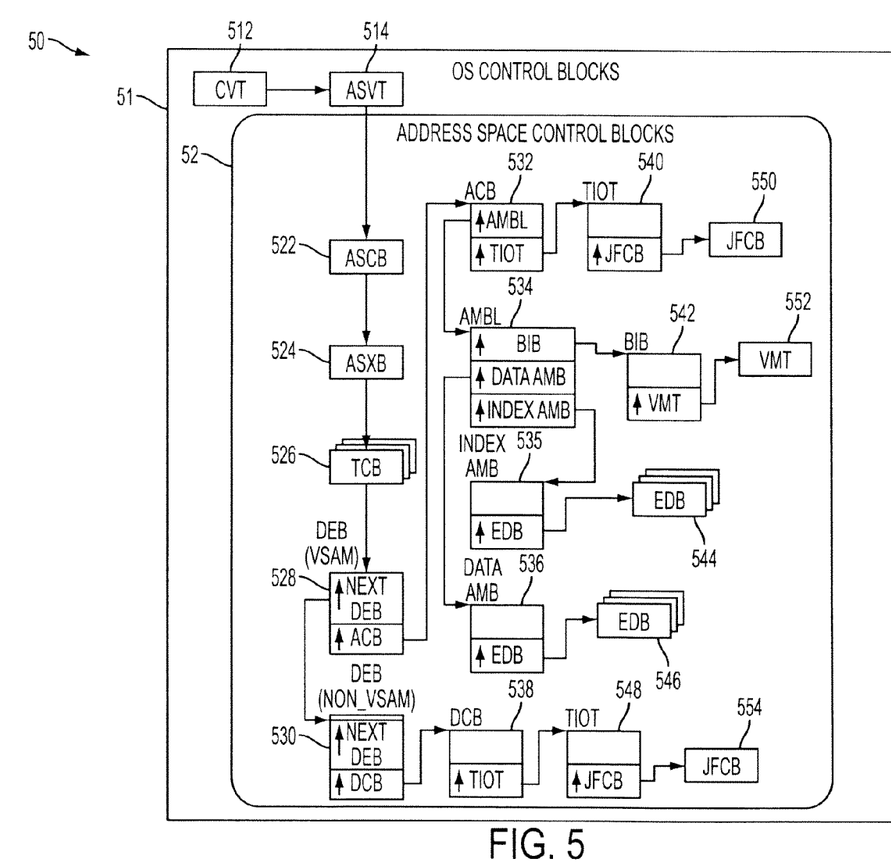
FIG. 5 is a block diagram illustrating exemplary locations of control block information according to one embodiment of the disclosure.

The control blocks to be updated to complete the migration process vary by the operating system and data set type. An explanation is now provided of control blocks to be updated in an embodiment in which the IBM mainframe operating system, Z/OS® is used. FIG. 5 is a block diagram illustrating exemplary locations of control block information within the operating system and application spaces according to one embodiment of the disclosure. An operating system 50 has a control space 51 with two control blocks: a communications vector table (CVT) 512 and an address space vector table (ASVT) 514. Within the control space 51 is an application space 52. The application space 52 includes an address space control block (ASCB) 522 which points to an address space extension block (ASXB) 524. The ASXB 524 points to a chain of task control blocks (TCB) 526. Each open data set has a device extent block (DEB) pointed to by the TCB 526. There are two data set types in Z/OS®: referred to as VSAM (virtual storage access method) and non-VSAM. The data set location information is stored differently for each data set type.

A DEB 528 for a VSAM data set type points to an access method control block (ACB 532) pointing to a task input output table (TIOT) 540 where a unit control block (UCB) address is updated. The TIOT 540 also points to a job file control block (JFCB) 550 where a VOLSER (volume identity) and a DSCB (data set control block) information is updated. If the data set has more than five volumes, a JFCB extension (JFCBX) is updated with a new VOLSER information. Included in the ACB 532 is a pointer to an access method block list (AMBL) 534 which points to a base information block (BIB) 542. The BIB 542 points to a volume mount table (VMT) 552 where a UCB and a VOLSER information is updated. The AMBL 534 also points to an index access method block (AMB) 535 that contains an extent definition block (EDB) 544. The EDB 544 contains a track address and a UCB address information that is updated to reflect the new data set location. The AMBL 534 also points to a data AMB 536 that points to a EDB 546 that is updated to reflect the new data set location. The EDB 544 and the EDB 546 can be multiple records where each record identifies an extent of space on the volume. Additionally, a SIOT control block, not illustrated, is updated from a GETDSAB service. GETDSAB is a programming MACRO for the High Level Assembler programming language and may be used to locate a data set association block (DSAB) of an allocated data set. A DSAB contains pointers to the TIOT 540 and a step input output table (SIOT).

The DEB 530 for a non-VSAM data set contains a UCB address and a track address which is updated. The DEB 530 points to a data control block (DCB) 538 pointing to a TIOT 548 that is updated with a new UCB address information. The TIOT 548 points to a JFCB 554 that contains a VOLSER and a DSCB information that is updated. If the data set has more than five volumes, a JFCBX is updated with a new VOLSER information. Additionally, a SIOT control block, not illustrated, is updated and obtained from a GETDSAB service.

Figure 6:
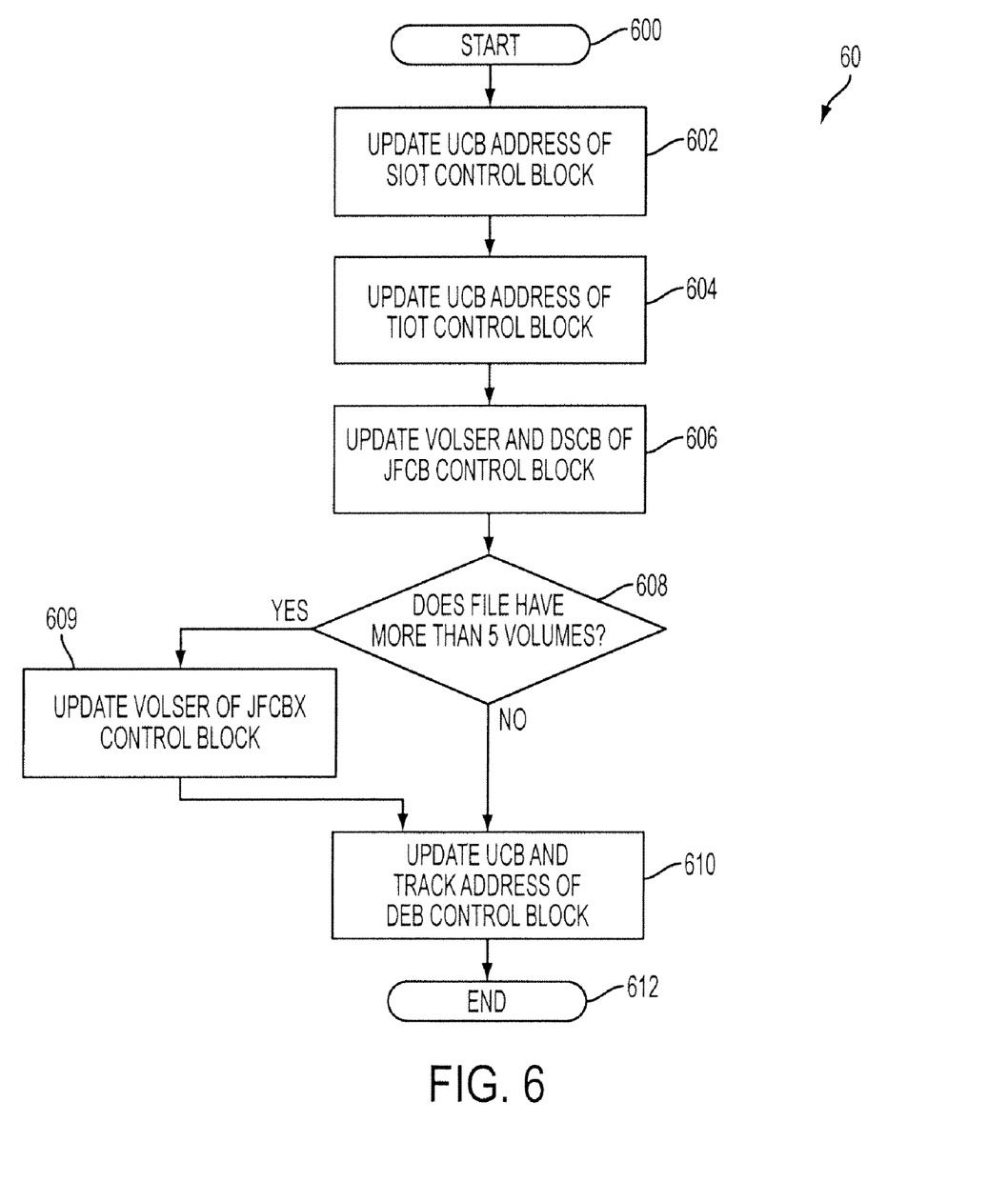
FIG. 6 is a flow diagram illustrating exemplary logic for updating control block information for non-VSAM data sets according to one embodiment of the disclosure.

As a result of the multiple types of data sets that may exist in the IBM Z/OS® operating system and the different control block structure of each, different logic for updating control block information can be used for each type of data set. Turning now to FIG. 6, logic for updating control block information for non-VSAM data sets is illustrated according to one embodiment of the disclosure. This logic is executed for each application identified in the operating system as accessing a non-VSAM data set involved in the migration process. The logic starts at box 600 and proceeds to update the UCB address of the SIOT control block at box 602. Next, at box 604, the logic updates the UCB address of the TIOT control block. Continuing to box 606, the logic updates VOLSER and DSCB addresses of the JFCB control block.

At box 608, the logic examines the application to determine if the data set spans more than five volumes. If the data set does not span more than five volumes, the logic proceeds to box 610. If the data set does span more than five volumes, the logic proceeds to box 609 to update the VOLSER address of the JFCBX control block. Continuing to box 610, the logic updates the UCB and the track address of the DEB control block. The logic then terminates at block 612. The logic illustrated by the flow diagram for updating control blocks of applications accessing data sets on non-VSAM storage volumes is only one embodiment for updating the control blocks. Several more embodiments may be implemented, for example, by changing the order in which the control blocks are updated.

Certain I/O requests are sensitive to the redirection phase. A request that depends on the volume ID information may cause an error if that request occurs during the redirection phase and the new volume id information has not been updated yet. For example, an I/O request to add a new record to a data set may require additional space for the data before the new record can be written to the data set. A request to add more space to a VSAM data set will fail if the migration process is in the redirection phase and the control block information for the VSAM data set has not been updated with the new volume information. In the IBM mainframe environment, end of volume (EOV) or extend data set processes are used to satisfy new space requests for data sets. Additional I/O intercepts are set up in the migration process to monitor new space requests for data sets. When a space request is received for a VSAM data set which is involved in a migration process and the migration process is in the redirection phase, the space request intercept updates the data set control block information with the new volume location information.

Figure 7A:
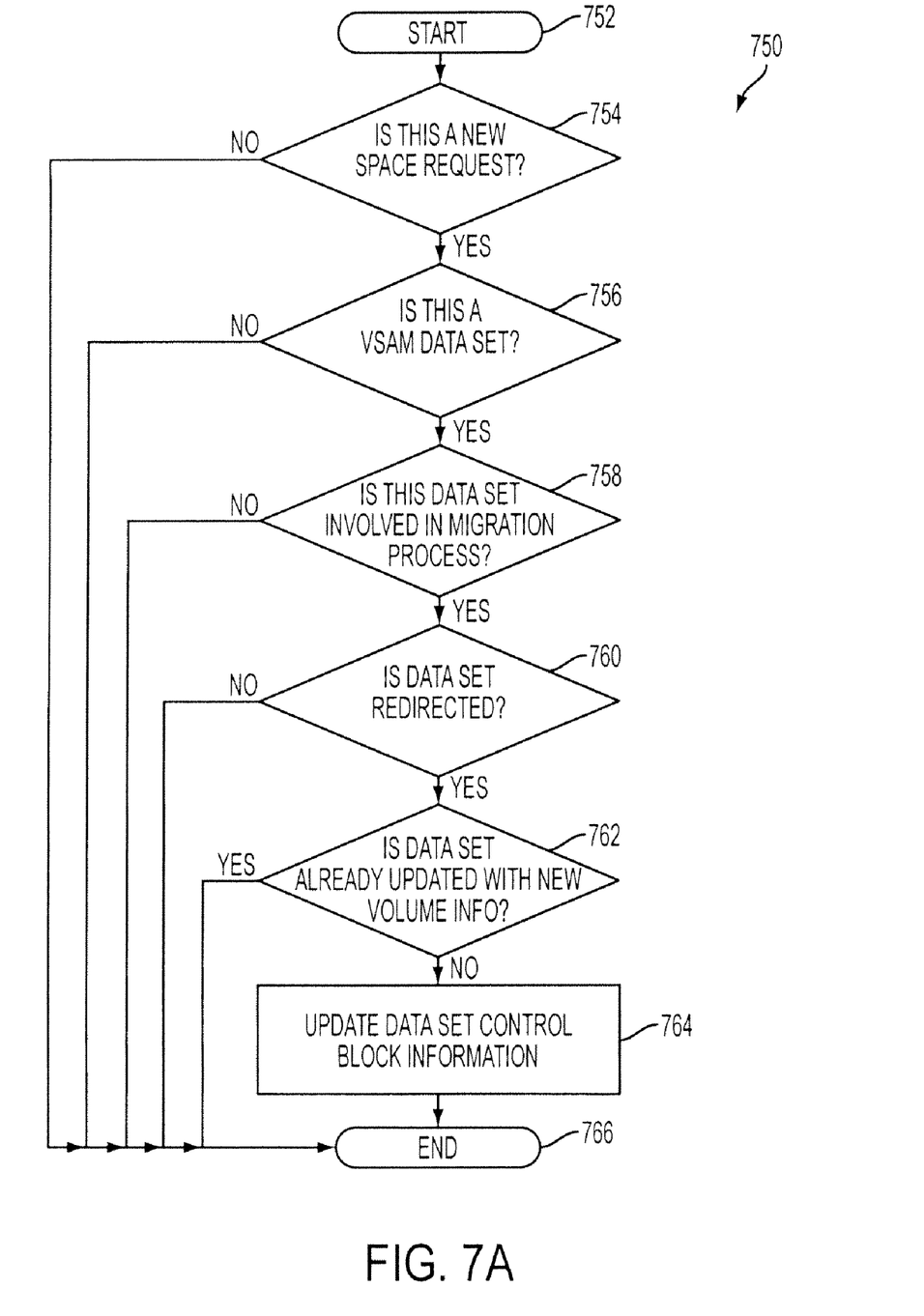
FIG. 7A is a flow diagram illustrating exemplary logic for monitoring data set space requests and updating application control block information for VSAM data sets according to one embodiment of the disclosure.

Turning now to FIG. 7A, a flow diagram illustrating logic for monitoring data set space requests and updating data set control block information for VSAM data sets according to one embodiment of the disclosure is presented. Logic 750 starts at box 752 and continues to box 754. At box 754, the logic checks if a new space request has been made. If an additional space request, the logic continues to box 756; otherwise, the logic ends at box 766. At box 756, the logic checks if the space request is for a VSAM data set. If the request is for a VSAM data set the logic continues to box 758; otherwise, the logic ends at box 766. At box 758, the logic checks if the data set is involved in the migration process. If the data set is involved in the migration process, the logic continues to box 760; otherwise, the logic ends at box 766. At box 760, the logic examines if the data set is redirected. If the data set is redirected, the logic continues to box 762; otherwise, the logic ends at box 766. At box 762, the logic examines if the data set is already updated with new volume information. If the data set is already updated, the logic ends at box 766; otherwise, the logic continues to box 764. At box 764, the data set control block information is updated. Following the update, the logic ends at box 766. The steps of updating the data set control block information at box 764 will now be described in more detail.

Figure 7B:
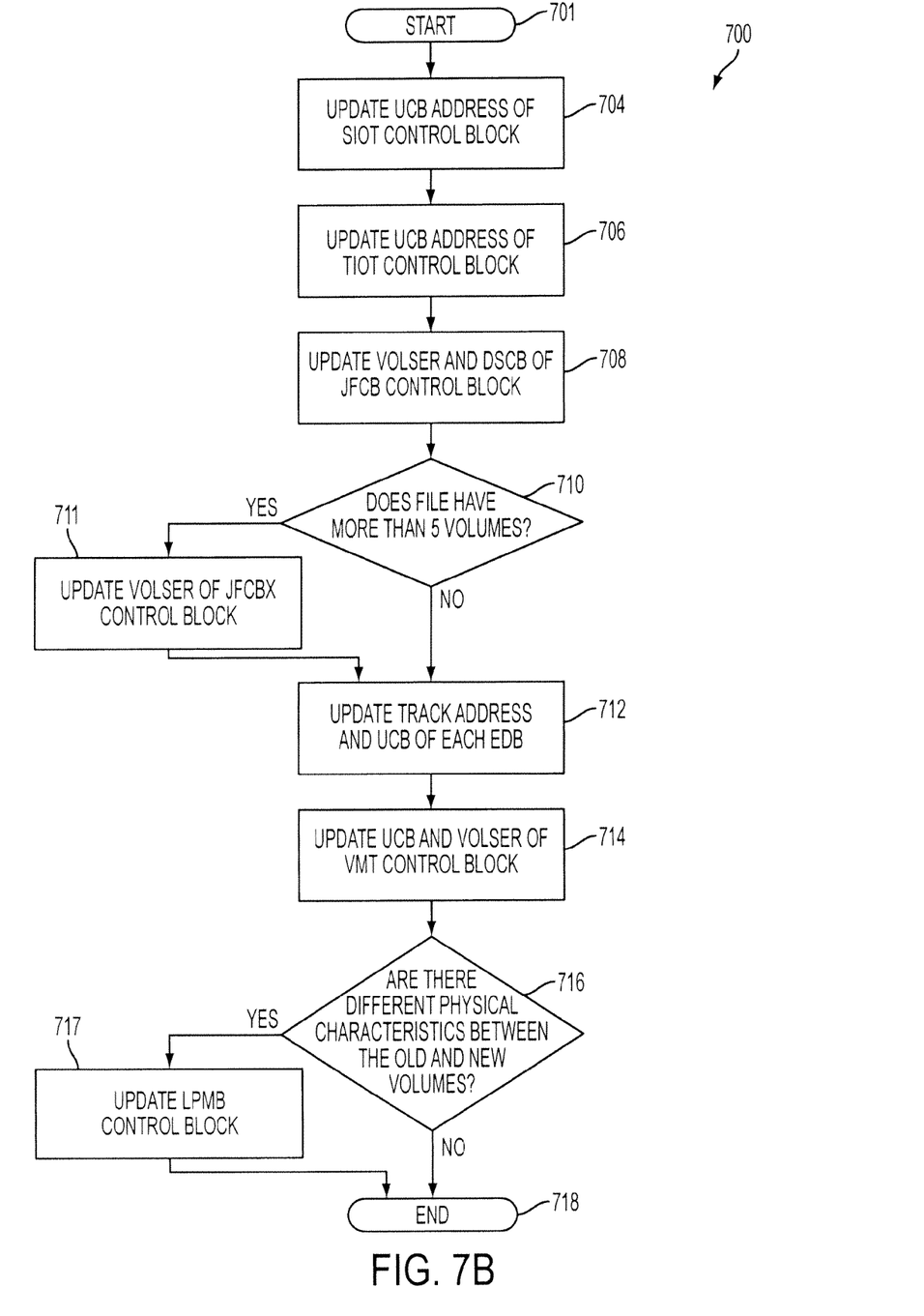
FIG. 7B is a flow diagram illustrating exemplary logic for updating control block information for VSAM data sets according to one embodiment of the disclosure.

Turning now to FIG. 7B, logic for updating control block information for VSAM data sets is illustrated according to one embodiment of the disclosure. This logic is executed for each application identified in the operating system as accessing a VSAM data set involved in the migration process. A routine 700 starts at box 701 and proceeds to box 704 to update the UCB address of the SIOT control block. Next, at box 706, the routine 700 updates the UCB address of the TIOT control block. At box 708, the routine 700 updates VOLSER and DSCB information of the JFCB control block. The routine 700 next, at box 710, examines the application control blocks to determine if the data set spans more than five volumes. If the data set does not span more than five volumes, the routine 700 continues to box 712. If the data set does span more than five volumes, the routine 700 proceeds to box 711 to update the VOLSER information of the JFCBX control block. After box 711, the routine 700 proceeds to box 712.

Continuing to box 712, the routine 700 updates track address and UCB information of each EDB control block in the application. At box 714, the routine 700 updates UCB and VOLSER information of the VMT control block. Continuing to box 716, the routine 700 determines if there are different physical characteristics between the old and new storage volumes involved in the migration process. If there are no physical differences, the routine 700 completes at box 718. If there are physical differences, the routine 700 updates the logical to physical mapping block (LPMB) control block at box 717 and then completes at box 718. The routine 700 illustrated for updating control blocks of applications accessing VSAM data sets is only one embodiment for updating the control blocks. Several more embodiments may be implemented by, for example, changing the order in which the control blocks are updated.

Figure 8:
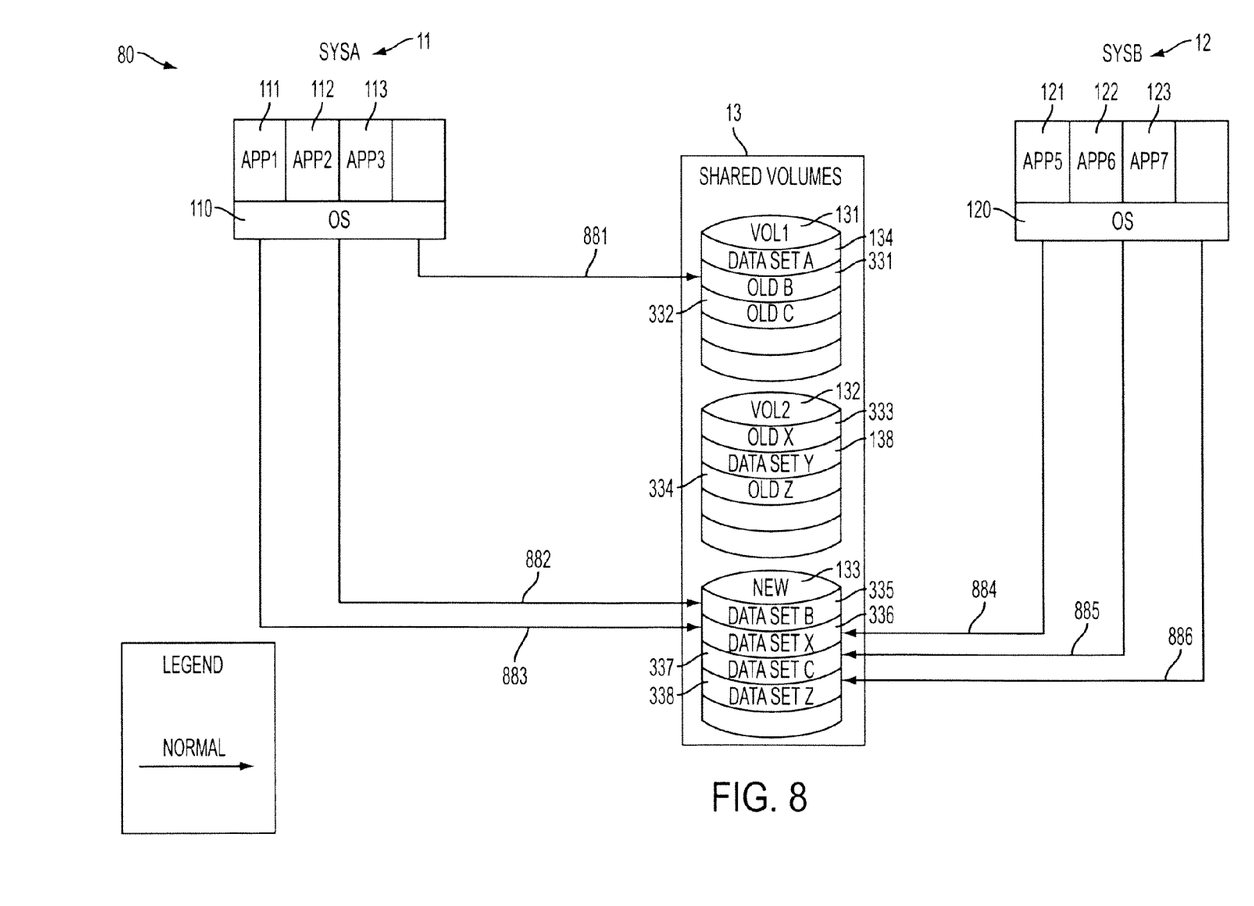
FIG. 8 a block diagram illustrating the completed migration process with the I/O intercepts removed and the migration process terminated according one embodiment of the disclosure.

The migration process is complete when applications accessing data sets involved in the migration process have been updated to reflect the new volume information or the application has terminated or restarted. Turning now to FIG. 8, a block diagram illustrating the completed migration process with the I/O intercepts removed and the migration process terminated according one embodiment of the disclosure is presented. When the migration is complete, the migration processes 214, 224 terminate and the I/O intercepts 24, 25 are removed. After the I/O intercepts 24, 25 have been removed, the applications 111-113, 121-123 access the data sets by making a request to the operating systems 110, 120 in a similar manner as before the migration process started. However, the data sets being accessed have been migrated to the new volume.

In the illustrated example, in response to the application(s), the operating system 110 creates I/O request 881 to access data set A 134 of volume 131, I/O request 882 to access data set B 335 of volume 133, and I/O request 883 to access data set X 336 of volume 133. Additionally, in response to the application(s), the operating system 120 creates I/O request 884 to access data set X 336 of volume 133, I/O request 885 to access data set C 337 of volume 133, and I/O request 886 to access data set Z 338 of volume 133. In this final state, the data set B 335, the data set X 336, the data set C 337, and the data set Z 338, which were involved in the migration process, are now stored on the volume NEW 133. All I/O requests created by the operating system 110 and the operating system 120 on behalf of an application(s) from the system A 11 and the system B 12 are not redirected. Instead, the I/O requests proceed to the storage volumes indicated in the control blocks of the applications that make the I/O request to the operating system. I/O requests which had been set up before the migration process began have been redirected to the appropriate new storage volume.

Although data sets are referred to throughout this disclosure, the process is not to be limited to migrating data sets, but also to migrating any information structure. For example, data sets are frequently used in the IBM Z/OS® operating system, however, this process may also be applied to files in the WINDOWS®, UNIX®, or LINUX® operating systems.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. While the disclosure has been presented in the IBM mainframe environment, one of ordinary skill would appreciate that the general teachings herein are equally applicable to other environments, including UNIX, LINUX, and WINDOWS operating systems. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such alternative environment and later developed processes, machines, manufacture, compositions of matter, means, methods, or steps.

As will be appreciated by one skilled in the art, the present invention may be embodied as a system, method or compute program product. Accordingly, the present invention may take the form of an entirely hardware embodiment, an entirely software embodiment (including firmware, resident software, micro-code, etc.) or an embodiment combining software and hardware aspects that may all generally be referred to as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but is not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with the instruction execution system, apparatus, or device. The computer usable program code may be transmitted using any appropriate medium, including but not limited to wireless, wireline, optical fiber cable, RF, etc.

Computer program code for carrying out operations of the present invention may be written in any combination of one or more programming languages, include an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to a external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagram, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

While it is understood that the logical data set migration process software may be deployed by manually loading directly in the client, server and proxy computer via loading as storage medium such as a CD, DVD, etc., the process software may also be automatically or semi-automatically deployed into a computer system by sending the process software to a central server or a group of central servers. The process software is then downloaded into the client computers that will execute the process software. Alternatively the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server then stored on the proxy server.

The logical data set migration process software is shared, simultaneously serving multiple customer in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, and hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software applications, their transactions are differentiated by the parameters included in the transactions that identify the unique customer and the type of service for that customer. All of the CPU units and other measurements of use that are used for the services for each customer are recorded. When the number of transactions to any one server reaches a number that begins to effect the performance of that server, other servers are accessed to increase the capacity and to share the workload. Likewise when other measurements of use such as network bandwidth, memory usage, storage usage, etc. approach a capacity so as to effect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software applications service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to reduce the transfer of payments.

In another embodiment, the program code may be hosted by a service provider or solution integrator and executed on behalf of the customer.

What is claimed is:

1. A method for completing a migration of an open data set from a first storage location to a second storage location, comprising:
   identifying any applications accessing the open data set being migrated; and
   updating control information of the identified application(s) accessing the open data set to reflect the second storage location, without terminating the identified application(s) or closing the data set, so the identified application(s) will access the open data set at the second location using the updated control information.

2. The method of claim 1, further comprising establishing I/O intercepts that redirect I/O requests from the first storage location to the second storage location.

3. The method of claim 1, in which identifying is accomplished by examining at least one operating system control block.

4. The method of claim 1, further comprising establishing an I/O intercept for the identified applications.

5. The method of claim 1, further comprising mirroring changes to the data set on the first location and the second location.

6. The method of claim 1, further comprising terminating the I/O intercept after updating control information has completed.

7. The method of claim 1, in which the second storage location contains at least one VSAM data set.

8. The method of claim 5, in which updating control information comprises updating a step input output table (SIOT), a task input output table (TIOT), a job file control block (JFCB), and a device extent block (DEB).

9. The method of claim 6, in which updating control information further comprises updating a job file control block extension (JFCBX) if the open data set spans more than five storage volumes.

10. The method of claim 1, in which the second storage location contains at least one non-VSAM data set.

11. The method of claim 8, in which updating control information comprises updating a step input output table (SIOT), a task input out table (TIOT), a job file control block (JFCB), an extent definition block (EDB), and a volume mount table (VMT).

12. The method of claim 9, in which updating control information further comprises updating a job file control block extension (JFCBX) if the open data set spans more than five storage volumes.

13. The method of claim 8, in which updating control information further comprises updating a logical to physical mapping block (LPMB) if the second storage location physically differs from the first storage location.

14. A computer program product, comprising a computer readable physically tangible storage device having a computer readable program code stored therein, said program code configured to be executed by a processor of a computer system to implement a method for completing a migration of an open data set from a first storage location to a second storage location, comprising:
said processor identifying any applications accessing the open data set being migrated; and
said processor updating control information of the identified application(s) accessing the open data set to reflect the second storage location, without terminating the identified application(s) or closing the data set, so the identified application(s) will access the open data set at the second location using the updated control information.

15. The computer program product of claim 14, said method further comprising establishing I/O intercepts that redirect I/O requests from the first storage location to the second storage location.

16. The computer program product of claim 14, in which identifying is accomplished by examining at least one operating system control block.

17. The computer program product of claim 14, said method further comprising establishing an I/O intercept for the identified applications.

18. The computer program product of claim 14, said method further comprising mirroring changes to the data set on the first location and the second location.

19. The computer program product of claim 14, said method further comprising terminating the I/O intercept after updating control information has completed.

20. The computer program product of claim 14, in which the second storage location contains at least one VSAM data set.

21. A system comprising a processor, a memory coupled to the processor, and a computer readable storage device coupled to the processor, said storage device containing program code configured to be executed by the processor via the memory to implement a method for completing a migration of an open data set from a first storage location to a second storage location, comprising:
said processor identifying any applications accessing the open data set being migrated; and
said processor updating control information of the identified application(s) accessing the open data set to reflect the second storage location, without terminating the identified application(s) or closing the data set, so the identified application(s) will access the open data set at the second location using the updated control information.

22. The system of claim 21, said method further comprising establishing I/O intercepts that redirect I/O requests from the first storage location to the second storage location.

23. The system of claim 21, in which identifying is accomplished by examining at least one operating system control block.

24. The system of claim 21, said method further comprising establishing an I/O intercept for the identified applications.

* * * * *